April 13, 1943.    W. L. KITSMAN    2,316,339
SURGE SUPPRESSION
Filed Dec. 17, 1940
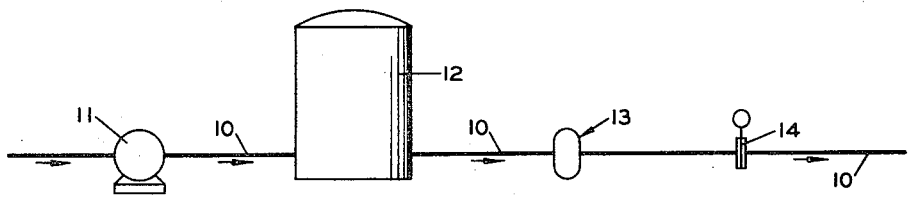
FIG.1
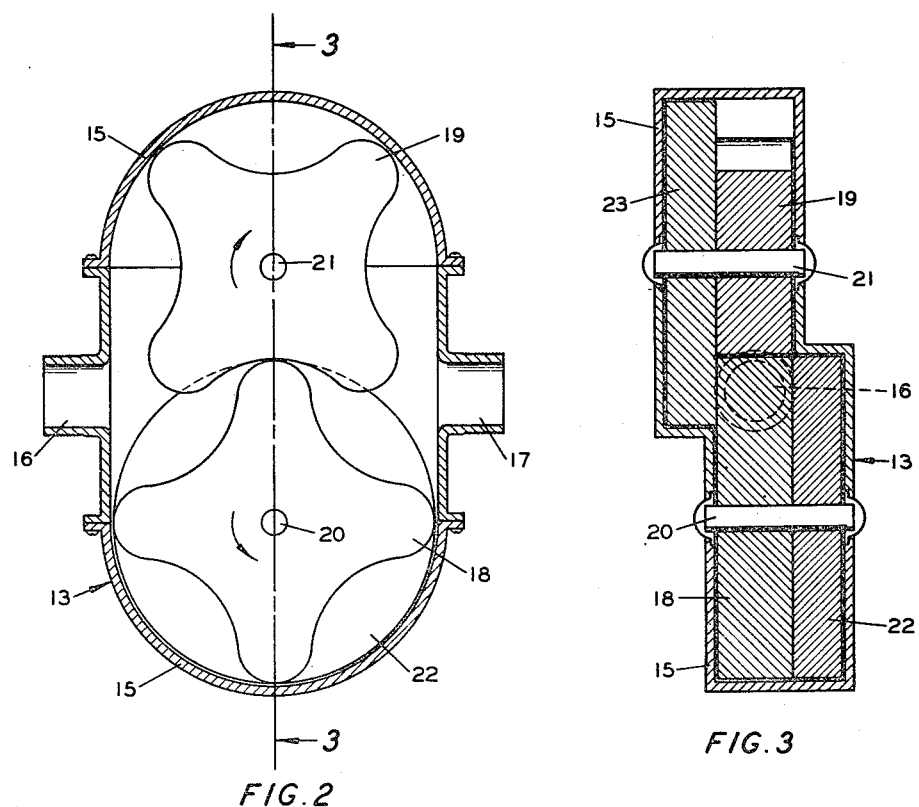
FIG.2
FIG.3
INVENTOR
W. L. KITSMAN
BY
Hudson, Young, Stanley & Yinger
ATTORNEY Patented Apr. 13, 1943

2,316,339

UNITED STATES PATENT OFFICE.

2,316,339

SURGE SUPPRESSION

William L. Kitsman, Bartlesville, Okla., assignor to Phillips Petroleum Company, a corporation of Delaware Application December 17, 1940, Serial No. 370,561

2 Claims. (Cl. 138—26)

This invention relates to apparatus for suppressing fluid surge due to fluctuations in flow conditions of fluid that is being transmitted through various types of conduits including pipe lines.

The surging action of fluid flowing through a conduit has presented a major problem in fluid transmission for these many years. This phenomenon, which is occasioned primarily by sudden variations in the pressure of the fluid, has made it virtually impossible to accurately measure the volume of fluid passing through a line by conventional forms of orifice meters or positive displacement measuring devices. Furthermore, fluid surge is oftentimes very deleterious in its effects as it imposes repeated and highly undesirable shock loads on a transmission system, resulting in premature failure of the equipment and increased maintenance costs.

Numerous attempts have been made in the past to eliminate fluid surge and the objectionable effects resulting therefrom. None of these attempts has proven entirely satisfactory, however, due to inherent weaknesses in design and operation of the individual systems. The best known present-day method of reducing surges in fluid transmission systems contemplates inserting a chamber containing a compressible medium, such as air or some other gas, in the system. The compressible medium is compressed or permitted to expand by the fluid, depending on flow conditions, to thereby dampen surges to an appreciable extent. The main disadvantage in this method resides in the fact that pressure and temperature characteristics of the fluid may be such that considerable volumes of the compressible medium are absorbed therein, thereby necessitating the periodic supplying of additional compressible medium to the system. It is obvious that such a system is undependable and impractical from an operating point of view.

The practice of the present invention overcomes the disadvantages indicated above and provides apparatus for positively and dependably suppressing surges in fluid transmission systems under various conditions of operation. As will be more fully set forth further along in this specification, my invention utilizes the inertia of a rotating mechanism to eliminate surges in a flow line and induces a uniform flow rate without any of the injurious impacts experienced heretofore. The rotating mechanism is placed in a fluid transmission line and is caused to rotate by the flow of fluid therethrough. In the event the fluid in the system tends to surge, my apparatus will oppose this tendency due to the inertia of the rotating parts.

It is therefore the primary object of this invention to provide apparatus for suppressing fluid surge in a fluid transmission conduit.

This invention has for another object the provision of apparatus of the character indicated which is simple and sturdy in construction; positive and dependable in operation; and relatively inexpensive to manufacture, operate, and maintain.

These, as well as additional objects and advantages, will be apparent to those skilled in the art by reference to the following detailed description and annexed drawing which respectively describe and illustrate a preferred embodiment of the invention, and wherein Figure 1 is a diagrammatic representation of a typical fluid transmission system in which my invention has been advantageously incorporated;

Figure 2 is an elevation view of the surge suppressor proper, partly in cross section; and Figure 3 is a transverse cross section view taken along line 3—3 of Figure 2.

Referring to Figure 1 of the drawing, I have denoted therein a conduit 10 for transmitting a liquid from a source of supply (not shown), in the direction indicated by the arrows, to a distant point. The liquid is urged through the conduit by means of a pump 11 which may be of the reciprocating type. Upon being discharged from the pump, the liquid is admitted into a surge tank 12 from whence it is transmitted through my surge suppressor which is generally represented by reference numeral 13. The use of surge tank 12 is optional, as the liquid may be transmitted from pump 11 directly through my surge suppressor 13 with equally satisfactory results. Any desired type of meter for accurately measuring the volume of liquid passing through the system, such as orifice meter 14, is positioned in the conduit downstream of the surge suppressor.

Referring next to Figures 2 and 3 for details of construction of the illustrated form of surge suppressor 13, it will be observed that the same includes a casing 15 having an inlet 16 and an outlet 17, both of which are externally threaded for connection to conduit 10. A pair of gear-like impellers 18 and 19 are rotatably supported on parallel shafts 20 and 21, respectively. It will be evident from an inspection of Figure 2 that impellers 18 and 19 are so constructed and arranged as to be in contact at all times and rotate simultaneously in opposite directions. Shafts 20 and 21 also support flywheels 22 and 23 which may be either integral with or connected to impellers 18 and 19, respectively, so as to rotate therewith. The use of these flywheels is recommended in most instances in order that by thus increasing the mass and consequently the inertia of the rotary members, my surge suppressor will afford requisite opposition to changes in velocity of rotation. On the other hand, if the impellers alone are fabricated with sufficient mass to perform their intended functions, the flywheels may be omitted.

For the purpose of outlining the mode of operation of the present invention, let us assume that the above described embodiment thereof has been installed and is in active service with pump 11 forcing liquid from a source of supply (not shown) through the illustrated system to a distant point. The liquid is admitted into casing 15 through inlet 16, and by virtue of its pressure, causes impellers 20 and 21 to rotate simultaneously in the directions indicated by the arrows in Figure 2. My surge suppressor 13, like similar well-known types of fluid motors, permits the passage of liquid under pressure between the inner surface of casing 15 and the peripheral surface of each impeller, and thence outwardly through outlet 17. The speed of rotation of impellers 20 and 21 and flywheels 22 and 23 is directly dependent upon the pressure and velocity of the liquid admitted into the casing. If the liquid in conduit 10 is at a constant uniform rate of flow, the flow of this liquid through suppressor 13 and the speed of the impellers will also be constant and uniform. On the other hand, should the rate of flow of the liquid in conduit 10 fluctuate momentarily, there will not be a corresponding change in speed of rotation of the impellers. This is due to the fact that the impellers and flywheels possess sufficient inertia to resist changes in rotational velocity, such as may be occasioned by surges in the system.

It is common knowledge that reciprocating pumps handling liquids or gases produce a pulsating or surging flow, and that these pulsations or surges are present on both the suction and the discharge sides of the pump. Pulsations produced on the discharge side of pump 11 are transmitted through conduit 10 and to suppressor 13. Since the impellers are both rotating at a substantially constant speed, they will, by virtue of their inertia, oppose any changes in the rate of fluid flow through the suppressor, and will thereby dampen out fluid pulsations in the transmission system. As a result of the suppression of pulsations and surges within the suppressor, the fluid upon being emitted through outlet 17 flows at a uniform rate through the conduit and the volume of fluid passing through the line may be properly measured by meter 14.

Although the present description has been directed to a particular type of surge suppressor, it is to be understood that any desired type of positive displacement fluid motor may be employed advantageously in the practice of this invention.

From the foregoing, it is believed that the construction, operation and advantages of my present invention will be readily comprehended by persons skilled in the art. It is to be clearly understood, however, that various changes in the apparatus may be resorted to without departing from the spirit of the invention, as defined by the appended claims.

I claim:

1. In a fluid transportation system wherein a pump transmits fluid into a conduit in surges, the improvement comprising a fluid motor in the conduit downstream of the pump, rotary means within the motor actuated by the pressure of the fluid flowing in the conduit, and inertia means connected directly to the rotary means of the fluid motor and rotatable therewith, said inertia means being of sufficient mass to store energy to resist fluid surges in the conduit when said fluid surges occur.

2. In a fluid transportation system wherein a pump transmits fluid into a conduit in surges, the improvement comprising a fluid motor in the conduit downstream of the pump and forming part of the conduit, said fluid motor having a casing with a fluid inlet and fluid outlet, rotary means within the casing actuated by the pressure of the fluid flowing through the casing to rotate the same, and inertia means connected directly to the rotary means of the fluid motor and rotatable therewith, said inertia means being of sufficient mass to store energy to resist fluid surges in the conduit when said fluid surges occur.

WILLIAM L. KITSMAN.